EUGENE E. CRILE
PAUL M. THOMAS AND
LAWRENCE W. WRIGHT
INVENTORS.

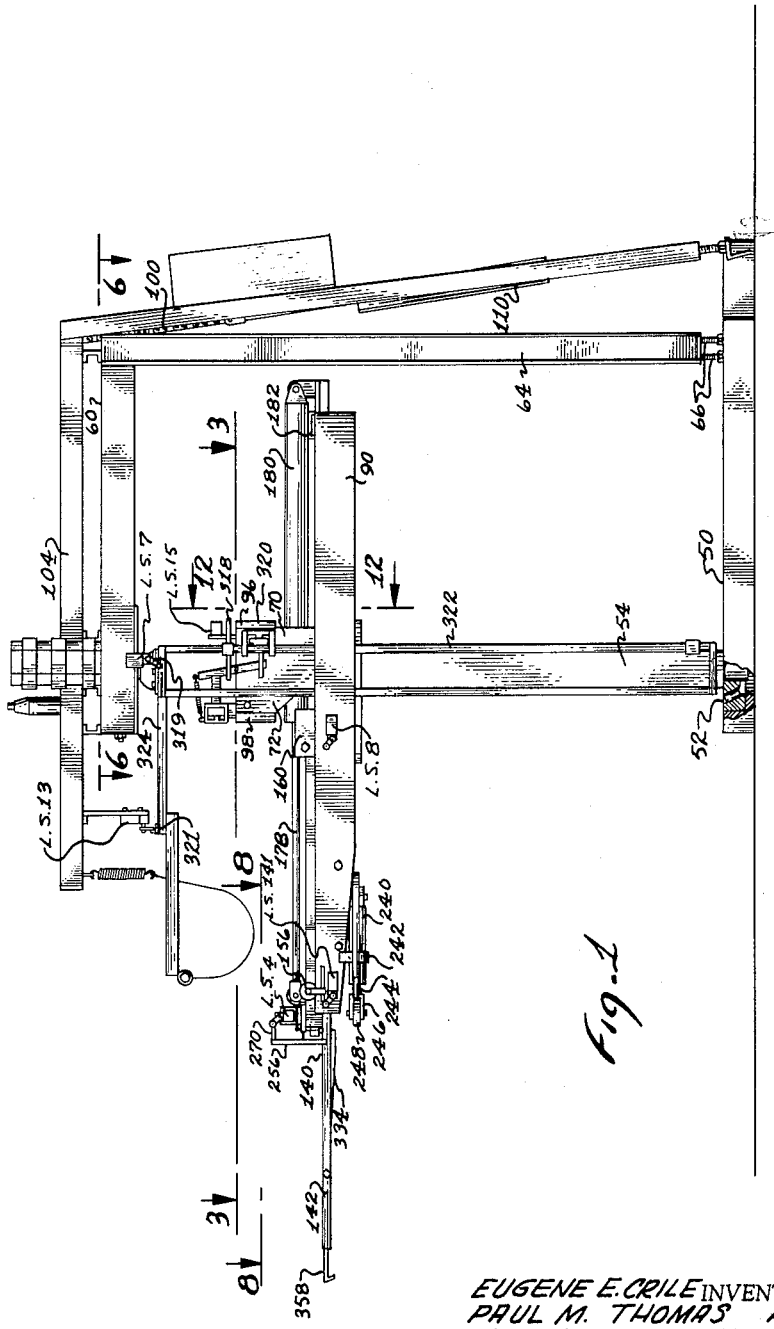

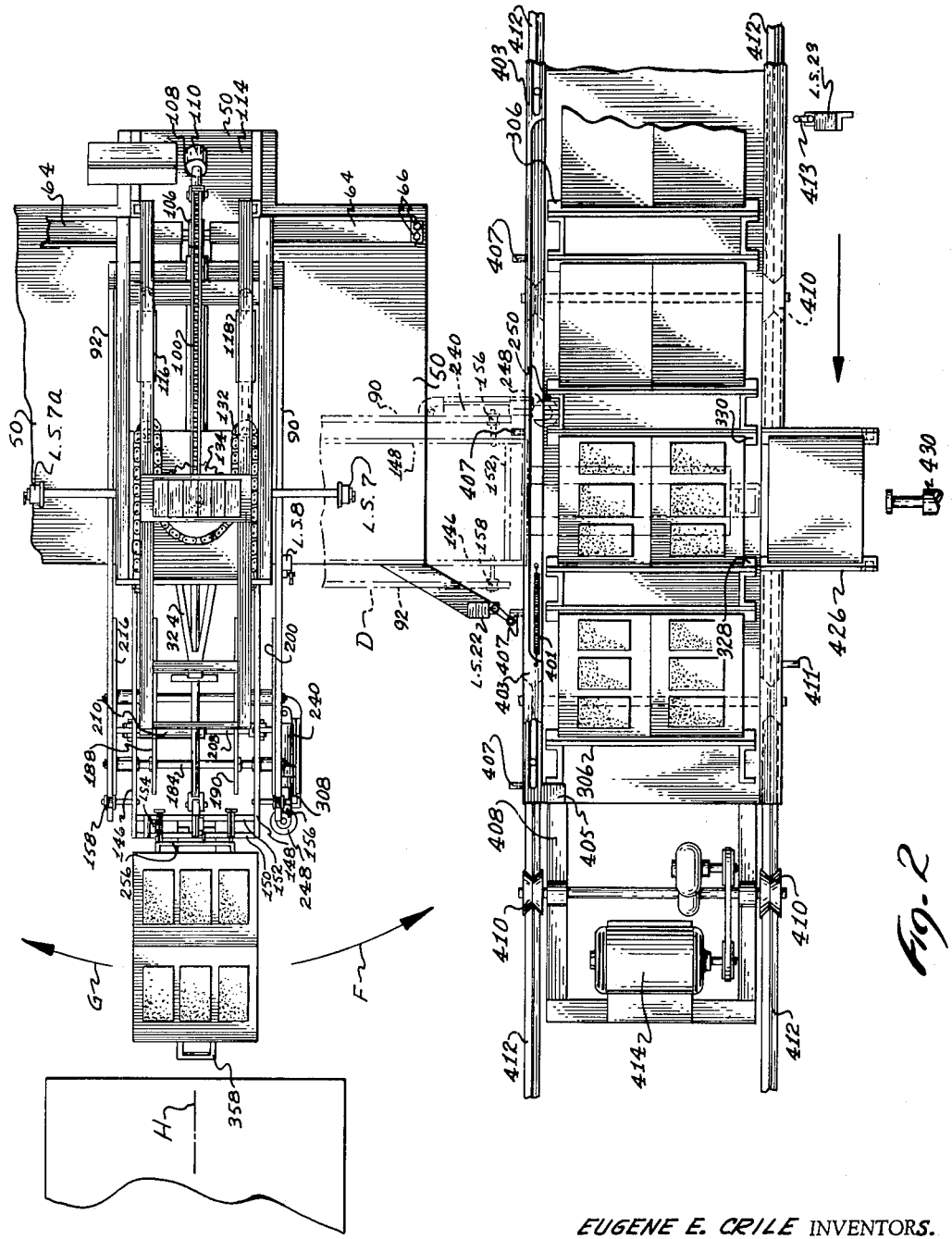

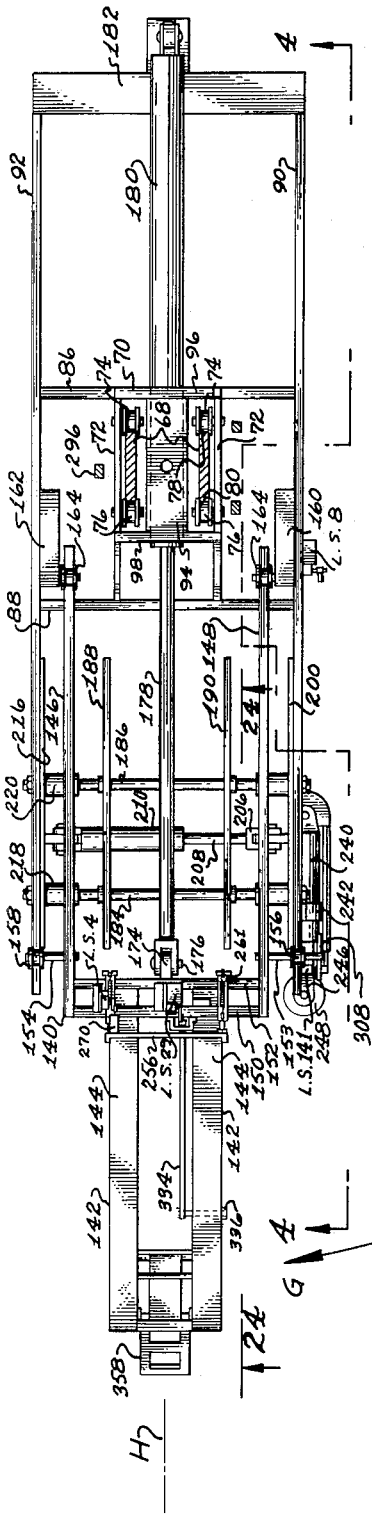

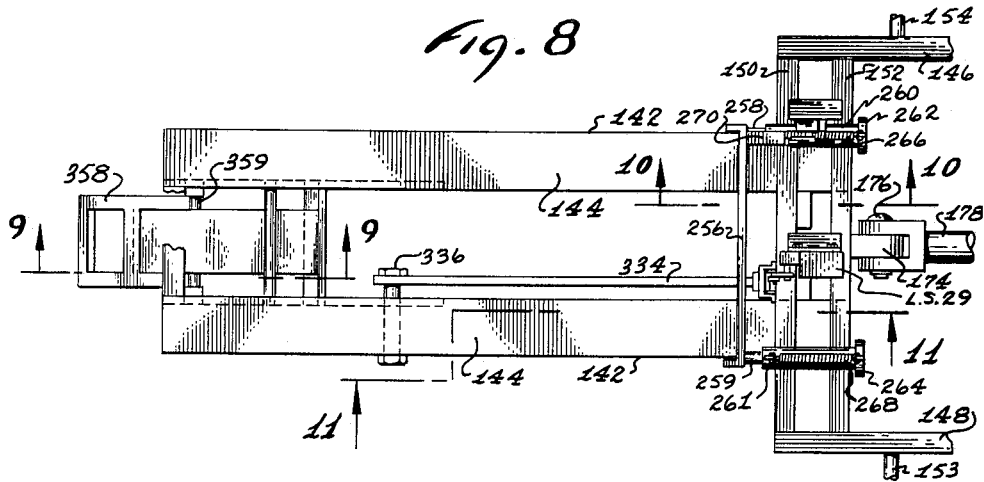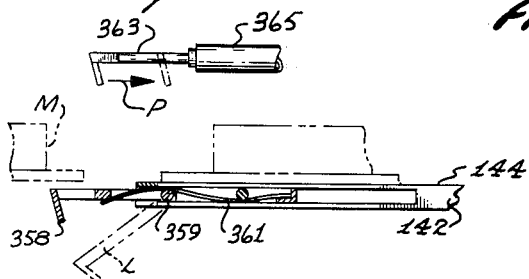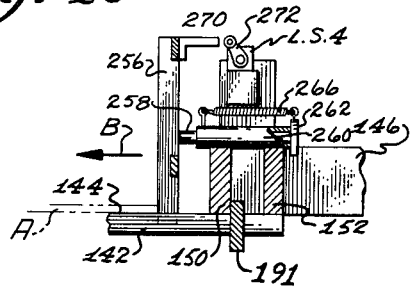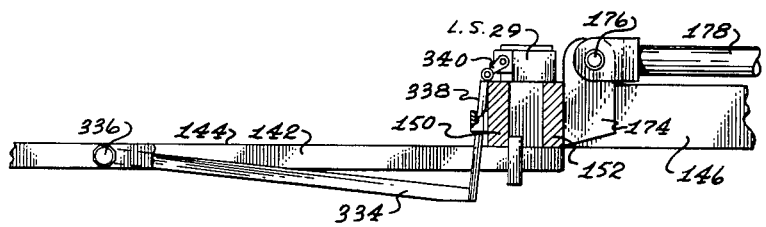

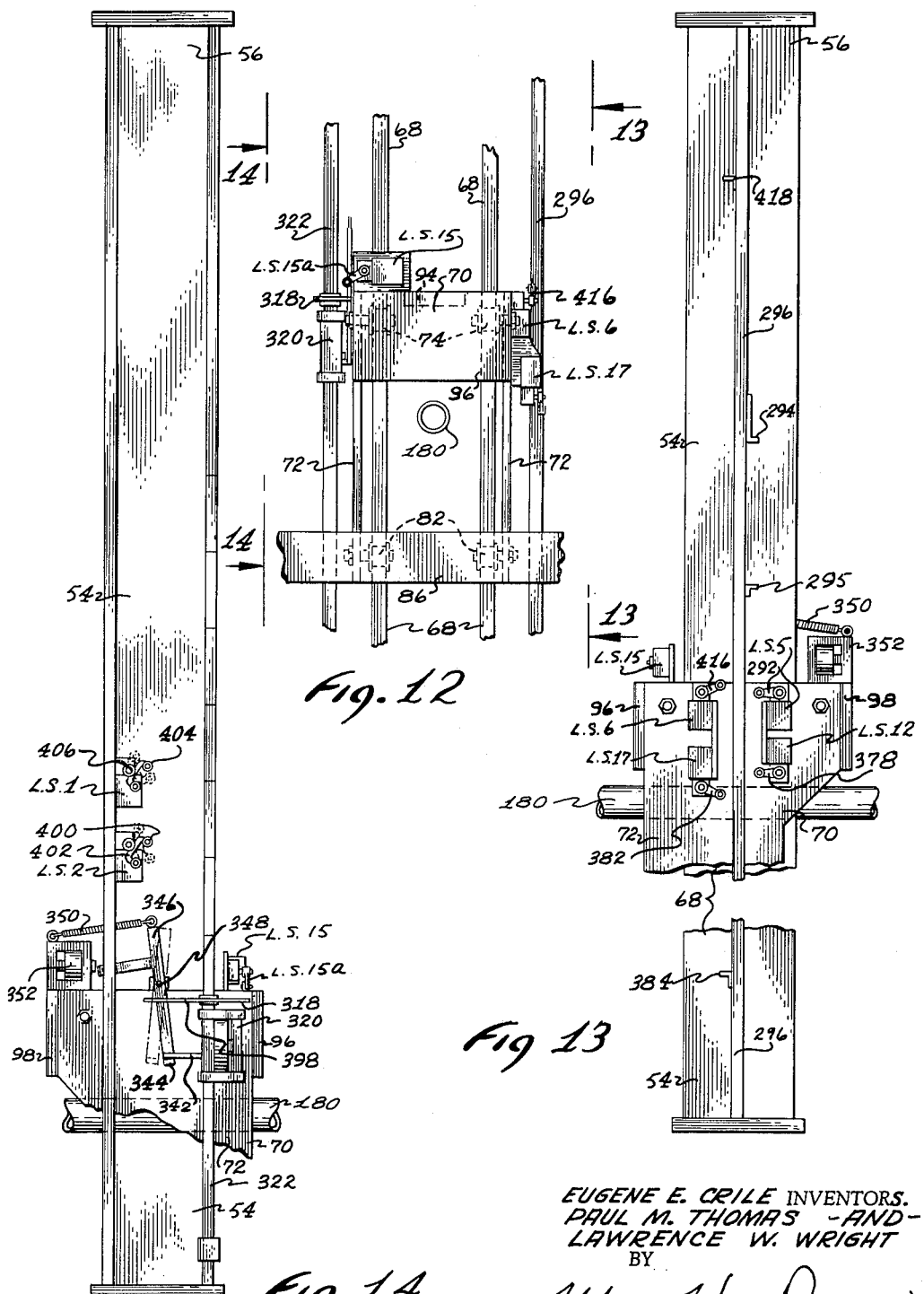

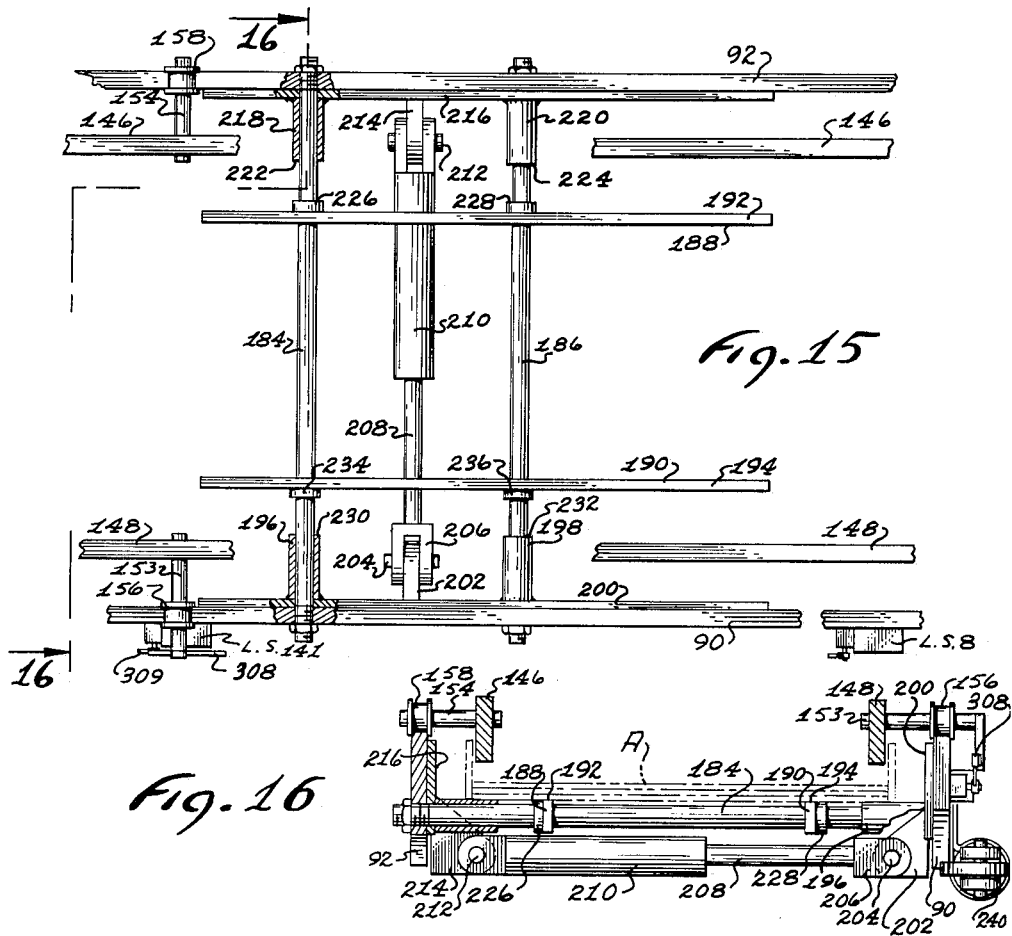
Fig. 15
Fig. 16
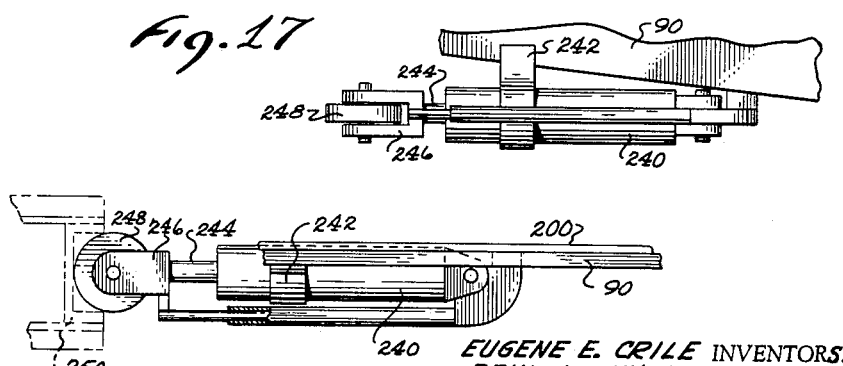
Fig. 17
Fig. 18
EUGENE E. CRILE INVENTORS.
PAUL M. THOMAS -AND-
LAWRENCE W. WRIGHT
BY
Wm. H. Dean
AGENT Jan. 11, 1966   E. E. CRILE ET AL   3,228,541
PALLET HANDLING MACHINE
Original Filed July 18, 1962   12 Sheets-Sheet 9
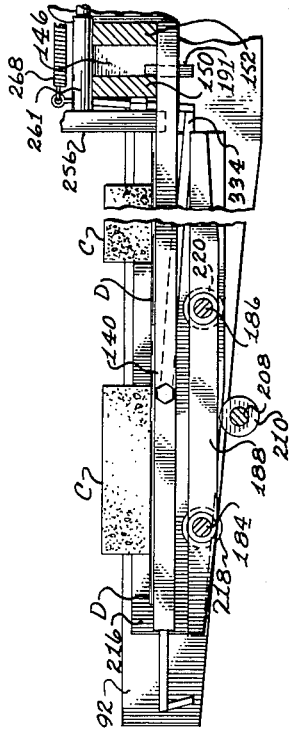
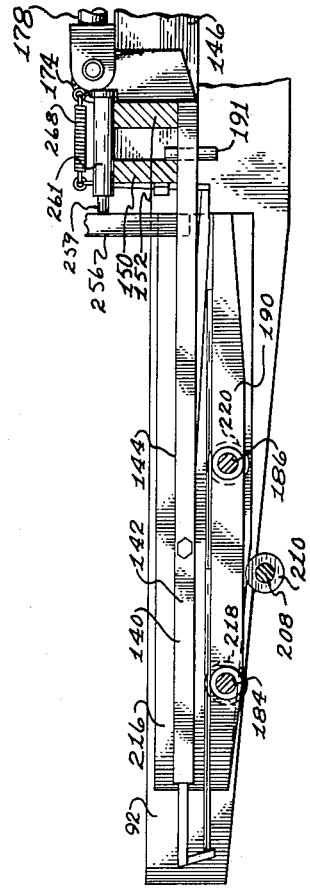
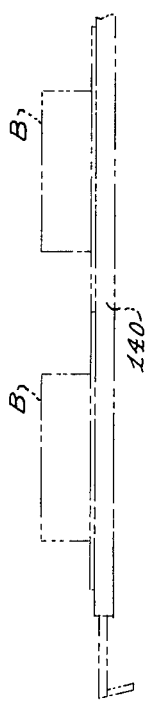
Fig. 24
Fig. 25
EUGENE E. CRILE INVENTORS.
PAUL M. THOMAS AND
LAWRENCE W. WRIGHT
BY
Wm. H. Dean
AGENT

BY

Wm. H. Dean
AGENT

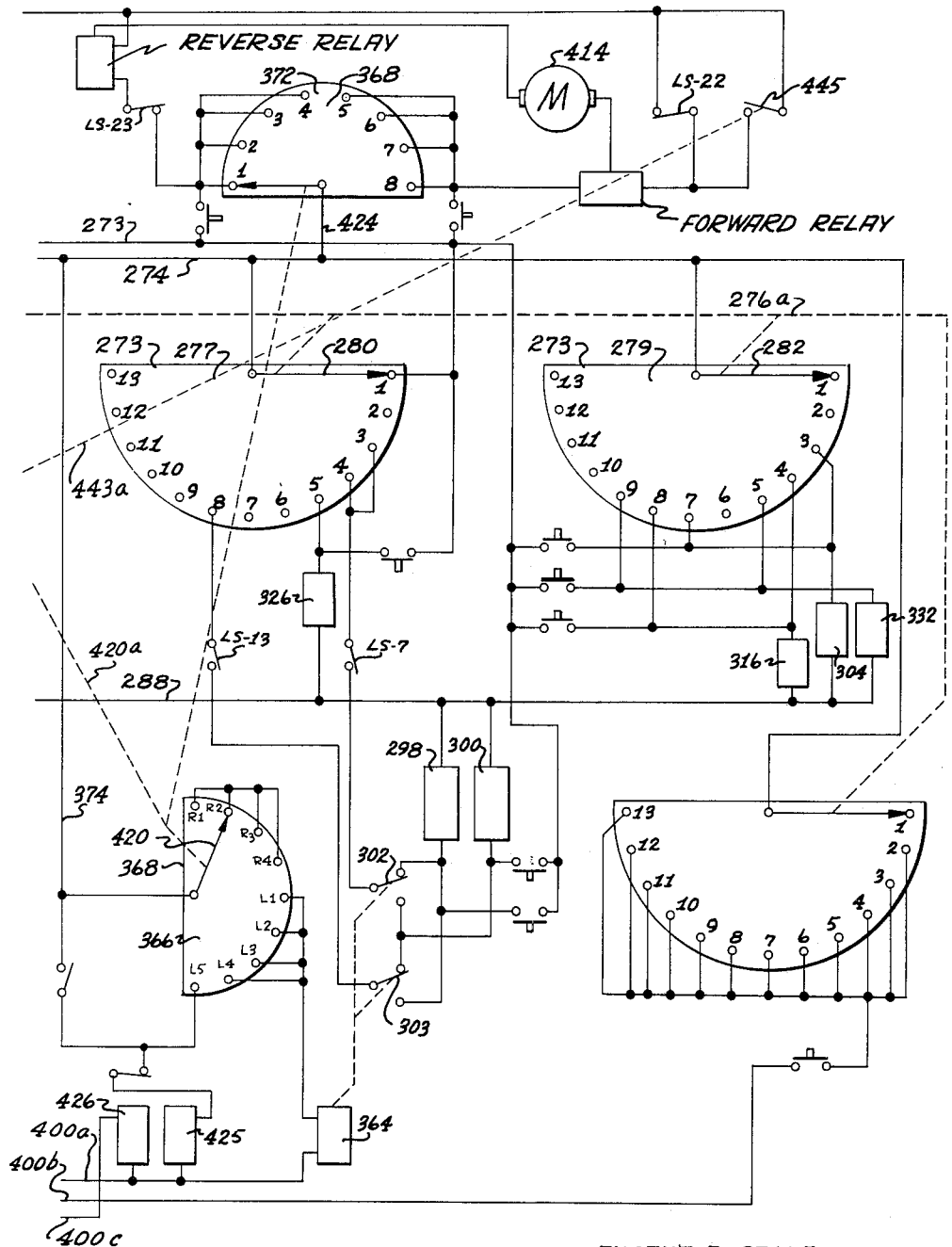

United States Patent Office 3,228,541
Patented Jan. 11, 1966

3,228,541
PALLET HANDLING MACHINE
Eugene E. Crile, 1619 W. Marletta Ave., Phoenix, Ariz.;
Paul M. Thomas, Phoenix, Ariz. (5630 E. Edgewood,
Scottsdale, Ariz.); and Lawrence W. Wright, Phoenix,
Ariz. (6501 E. Monte Rosa, Scottsdale, Ariz.)
Original application July 18, 1962, Ser. No. 211,477.
Divided and this application Dec. 18, 1964, Ser. No.
425,658
4 Claims. (Cl. 214—16.4)

This application is a division of application Serial No. 211,477 (now abandoned), filed July 18, 1962, which is a continuation-in-part of application Serial No. 28,929 (now abandoned), filed May 13, 1960.

This invention relates to a pallet handling machine and more particularly to a pallet handling machine adapted to receive laden pallets from a concrete block producing machine and to transfer such laden pallets to vertically spaced superimposed locations in pallet supporting racks adjacent to the concrete block producing machine.

In the production of concrete blocks, conventional block producing machines eject laden pallets which support one or more concrete blocks thereon. These pallets are always ejected from the block producing machine at a particular level and conventional pallet racks into which the pallets are loaded, generally comprise a plurality of vertically spaced superimposed shelves, some of which are below the delivery level of the concrete block producing machine and some of which are above the delivery level of the machine.

The relationship of the delivery level of the machine and the superimposed spaced shelves above and below said delivery level has created many difficult problems in the operation of automatic pallet handling machines which will accurately and properly fill all of the shelves of the racks with laden pallets.

It will be understood by those skilled in the art that such a pallet handling machine must always return to the concrete block producing machine at precisely its delivery level and then must move up or down properly to index with a respective unladen shelf of a rack adjacent to the block producing machine.

The high production rate of modern concrete block producing machines imposes problems in the handling of laden pallets delivered by such machines. Consequently, the rates at which pallet handling machines must operate are quite great when numerous movements, horizontally and vertically, are required properly to deliver laden pallets from the block producing machine to the racks and empty pallets from the racks to such a machine.

In addition to the high rates of operation required of a pallet handling machine, in accordance with the production rates of a concrete block producing machine, various precise locating operations must be carried out by the pallet handling machine in order to locate positions laterally with respect to pallet racks when positioning laden pallets therein. Such operations of laterally locating the laden pallets in position to be inserted in the racks must be accomplished quickly and precisely in order to prevent tipping of the racks or damage of the concrete blocks on the pallets.

Accordingly it is an object of the invention to provide a shelf height locating mechanism which precisely locates the vertical disposition of the pallet carriage of the machine above or below the delivery level of a concrete block producing machine so that laden pallets may accurately be placed at a proper vertical level with respect to the existing pallet rack shelves regardless of their mechanical condition or even though some shelves may be missing.

Another object of the invention is to provide a pallet handling machine having all of its operating mechanism swingable on a fixed vertical axis and which also comprises mechanism for moving a pallet carriage vertically and horizontally whereby such combined movements may be accomplished simultaneously in order to accommodate a high production rate of a concrete block producing machine and accurately to place laden pallets in pallet racks and to deliver unladen pallets back to the producing machine.

Other objects and advantages of the invention may be apparent from the following specification, appended claims, and accompanying drawings, in which:

FIG. 1 is a side elevational view of a pallet handling machine in accordance with the present invention;

FIG. 2 is a top or plan view thereof showing pallet receiving rack means and motorized mechanism for advancing the racks relative to the pallet handling machine and also illustrating by broken lines a varying position of mechanism of the pallet handling machine. FIG. 2 further discloses the disposition of the concrete block producing machine relative to the pallet handling machine and the receiving rack means;

FIG. 3 is a plan sectional view of the pallet handling machine of the invention taken from the line 3—3 of FIG. 1;

FIG. 4 is a fragmentary sectional view of the pallet handling machine of the present invention taken from the line 4—4 of FIG. 3;

FIG. 8 is a fragmentary sectional view taken from the line 8—8 of FIG. 1;

FIG. 9 is a fragmentary sectional view taken from the line 9—9 of FIG. 8;

FIG. 9a shows a modification of the hook shown in FIG. 9;

FIG. 10 is a fragmentary sectional view taken from the line 10—10 of FIG. 8;

FIG. 11 is a fragmentary sectional view taken from the line 11—11 of FIG. 8;

FIG. 12 is a fragmentary sectional view taken from the line 12—12 of FIG. 1 showing structure thereof on an enlarged scale;

FIG. 13 is a fragmentary elevational view taken from the line 13—13 of FIG. 12;

FIG. 14 is a fragmentary elevational view taken from the line 14—14 of FIG. 12;

FIG. 15 is an enlarged fragmentary plan sectional view of the pallet handling machine of the present invention, showing portions broken away and in section to amplify the illustration and illustrating means for locating laden pallets laterally with respect to the pallet carriage of the machine;

FIG. 16 is a transverse sectional view taken from the line 16—16 of FIG. 15;

FIG. 17 is an enlarged side elevational view of mechanism for locating the pallet carriage laterally with respect to the pallet rack;

FIG. 18 is a top or plan view of the mechanism shown in FIG. 17 and illustrating by broken lines elements of a pallet rack engaged by mechanism for locating the pallet carriage laterally with respect to the rack;

Figure 21:
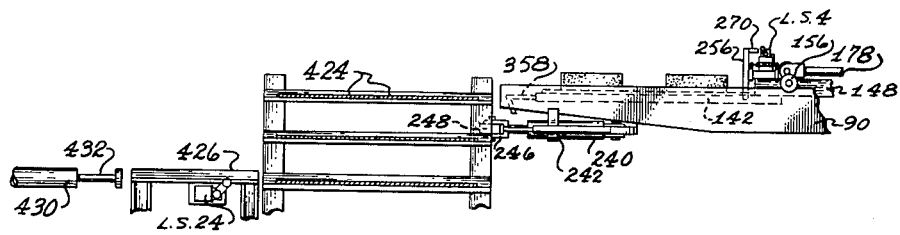
FIG. 21 is a fragmentary side elevational view of the pallet carriage of the present invention shown indexed with a pallet rack for the delivery of a laden pallet to the uppermost shelf of the rack and in position to eject an unladen pallet from said top shelf.
Figure 22:
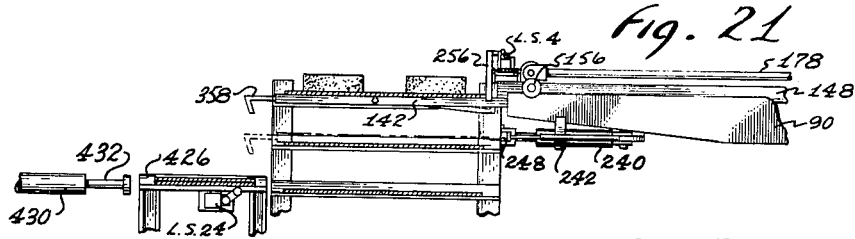
FIG. 22 is a view similar to FIG. 21 but showing a rack supporting the empty pallet ejected from the uppermost shelf of the rack and showing the placement of laden pallets on said upper shelf.
Figure 23:
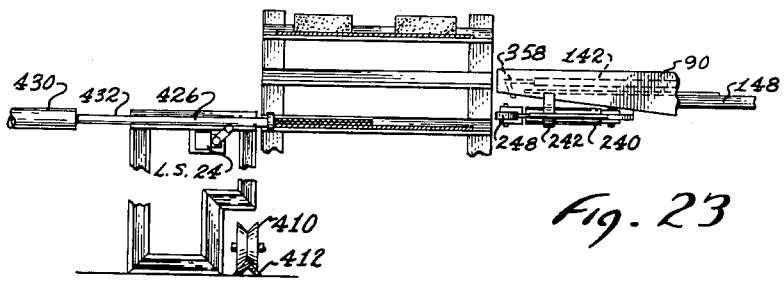
Figure 26:
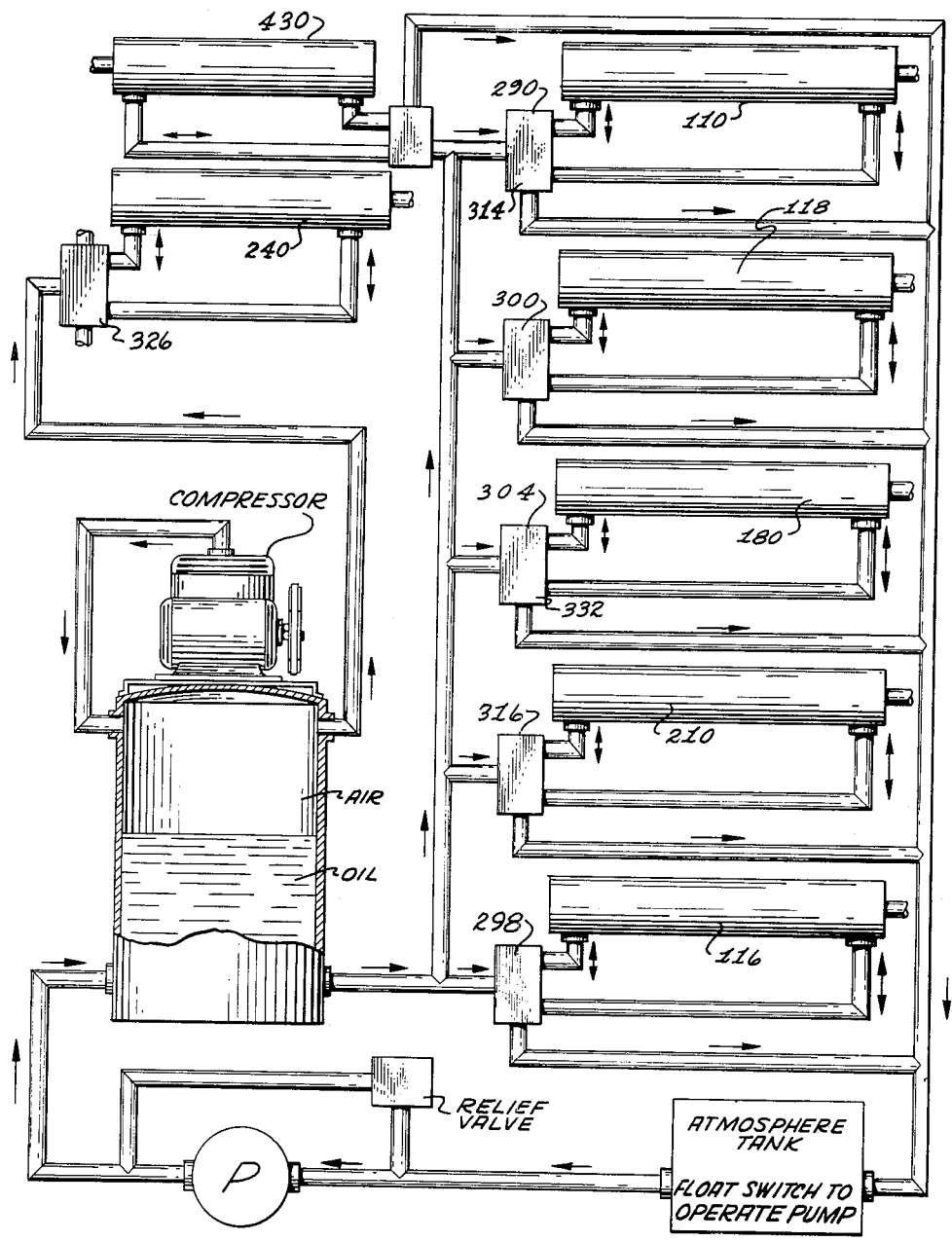
Figure 27:
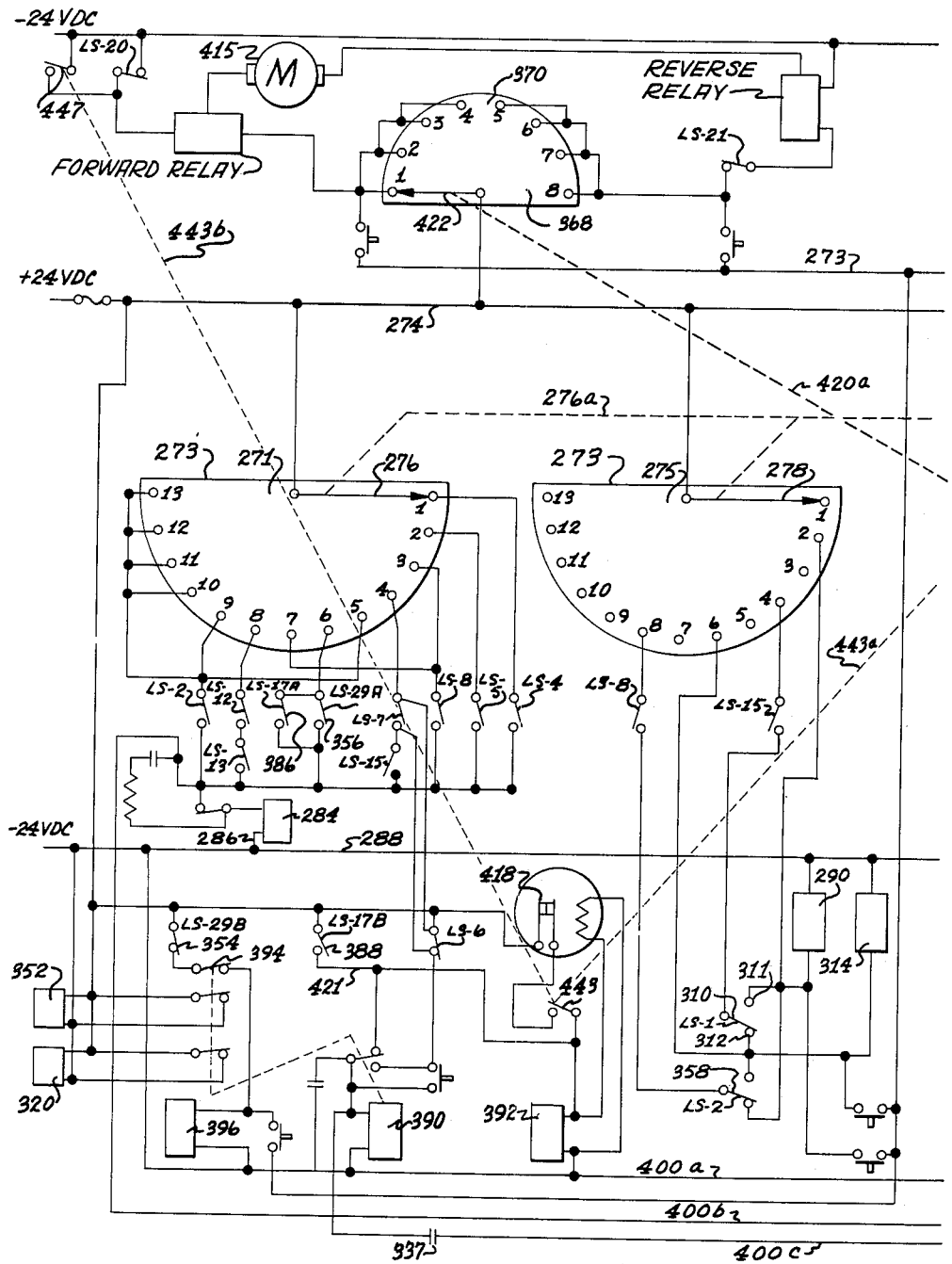

FIG. 23 discloses the pallet carriage of the machine approaching a position to pick up unladen pallets ejected from the top and third shelves of the rack, as illustrated in FIGS. 21 and 22;

FIG. 24 is a fragmentary sectional view taken from the line 24—24 of FIG. 3 and showing the mechanism of a pallet carriage on an enlarged scale and illustrating by broken lines a varying position thereof;

FIG. 25 is a view similar to FIG. 24 showing the manner in which the carriage of the present invention rakes unladen pallets from a rack so that such pallets may be carried back to the concrete block producing machine;

FIG. 26 is a diagrammatic illustration of the hydraulic system of the pallet handling machine, in accordance with the present invention; and FIGS. 27 and 28 are combined figures but on separate sheets of drawing illustrating diagrammatically the electrical equipment of the pallet handling machine, in accordance with the present invention.

Figure 5:
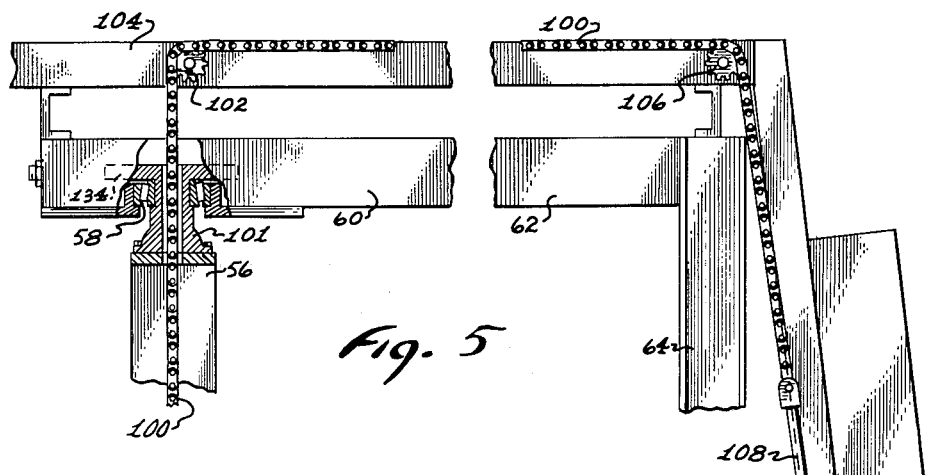
FIG. 5 is a fragmentary side elevational view of the pallet handling machine of the present invention shown in an enlarged scale to illustrate various mechanical details.

As shown in FIG. 1 of the drawings, the pallet handling machine of the present invention is provided with a base frame 50 having a thrust bearing 52 therein. Supported on this thrust bearing 52 and rotatable on a substantially vertical axis is a column 54 having an upper end portion 56, as shown in FIG. 5 of the drawings, which is supported in a bearing 58 having a vertical axis. This bearing 58 is supported by an upstanding frame member 60 which comprises a horizontal cantilever section 62 carried by downwardly diverging legs 64 which are adjustably supported on the base frame 50 by means of bolts 66.

As shown in FIG. 3 of the drawings, the column 54 is composed of a pair of spaced vertical track rails 68 on which a vertically movable frame 70 is mounted. This vertically movable frame 70, as shown in FIGS. 3 and 4 of the drawings, is provided with a pair of side plates 72. These side plates 72 are adjacent the track rail members 68.

Rotatably mounted on each of the side plates 72 are spaced rollers 74 and 76 which are located near the upper portion of the vertically movable frame 72. These rollers 74 and 76 engage respective edges 78 and 80 of one of the track rail members 68. It will be seen that the edges 78 and 80 form tracks for these rollers 74 and 76.

Each side plate 72 is also provided with a pair of rollers 82 and 84 mounted near the lower portion of the vertically movable frame 72. These rollers 82 and 84 also engage respective track edge portions 78 and 80 of the respective track rails 68.

Fixed to the side plates 72 of the vertically movable frame are cross members 86 and 88 which extend laterally into fixed connection with horizontal side bars 90 and 92 of the vertically movable frame 70. This vertically movable frame 70 is provided with a bar 94 which interconnects cross members 96 and 98 which are fixed to the plates 72. Secured to the cross member 94 is a chain 100 which extends upwardly through a bearing boss 101 fixed on the upper end of the column 56. The chain 100 extends upwardly and passes over a sprocket 102 which is rotatably mounted on a frame member 104 carried by the cantilever portion 62 of the upper frame member 60. The chain 100 passes over another sprocket 106 and is coupled to a plunger 108 of a hydraulic cylinder 110 which is anchored by means of a pin 112 to a member 114 of the frame. This hydraulic cylinder 110, when actuated, as will be hereinafter described, pulls the chain 100 over the sprockets 102 and 106 to elevate the vertically movable frame 70 which travels upwardly on the track rail 68 by means of the rollers 74, 76, 82 and 84, rotatably mounted on the side plates 68 of the vertically movable frame 70.

Figure 6:
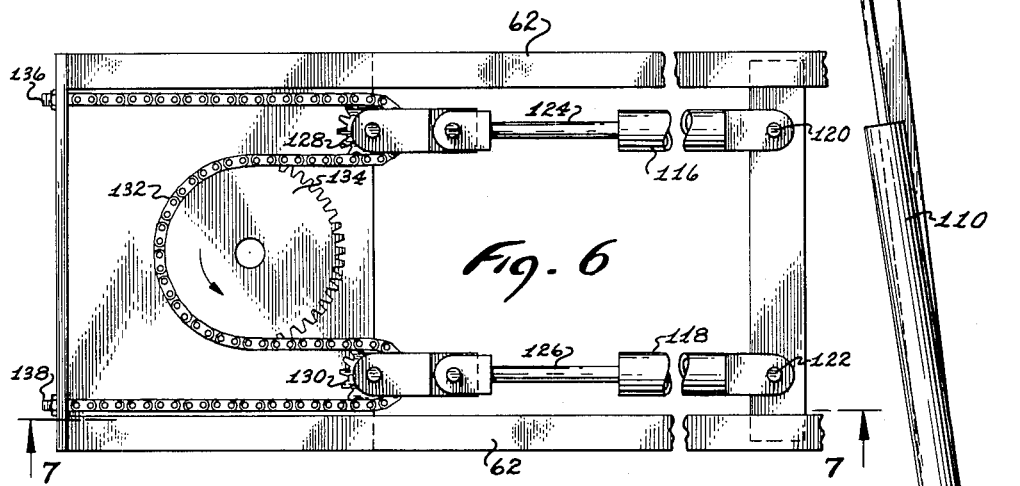
FIG. 6 is an enlarged fragmentary top or plan view of the pallet handling machine of the present invention showing means for pivoting the machine about a vertical axis.
Figure 7:
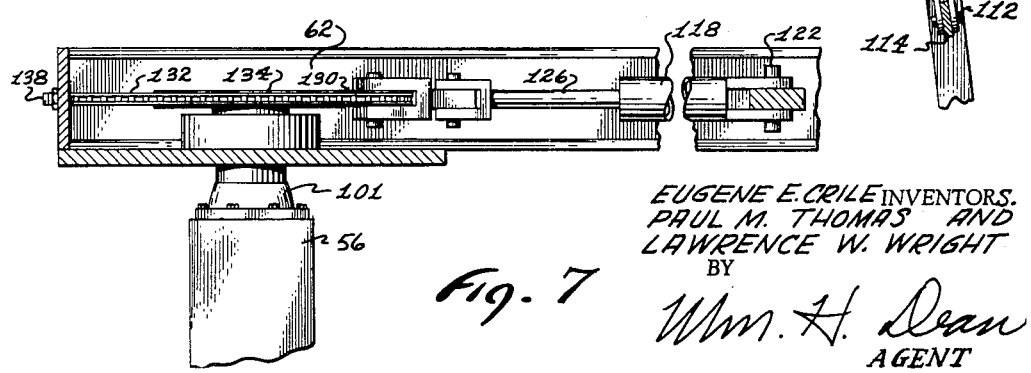
FIG. 7 is a fragmentary sectional view taken from the line 7—7 of FIG. 6.

The vertically movable frame 70 and the column 54 are pivotal about a vertical axis extending through bearings 52 and 58 by means of hydraulic cylinders 116 and 118 which are carried between the cantilever portions 62 of the upper frame member 60, as shown best in FIG. 6 of the drawings.

These cylinders 116 and 118 are pivotally mounted on pins 120 and 122 and are provided with respective plungers 124 and 126 carrying sprockets 128 and 130 which engage a chain 132.

This chain 132 passes over a sprocket 134 which is fixed to the bearing boss 101 which is secured to the upper end of the column 54, as hereinbefore described. Opposite ends of the chain 132 are fixed by bolts 136 and 138 to the upper frame 60 whereby the hydraulic cylinders 116 and 118 may alternately be energized to cause rotation of the column 54 and the vertically movable frame 70 connected therewith.

It will be understood that the column 54 as hereinbefore described, moves about a vertical axis aligned with the bearings 52 and 58 thereby pivoting the vertically movable frame 70 about said vertical axis.

Horizontally movably mounted on the vertically movable frame 70 is a pallet carriage 140. The pallet carriage is telescopically mounted on the frame 70 to move in a substantially horizontal disposition thereon. This pallet carriage 140 is provided with a pair of flat bars 142 which are substantially parallel and provide a horizontal upper surface 144 for the support of pallets to be carried thereon. As shown best in FIGS. 3 and 4 of the drawings, the pallet carriage 140 is provided with track bars 146 and 148 which are fixed to the flat bars 142 by cross members 150 and 152. Fixed to the track bars 146 and 148 are respective trunnions 153 and 154 which carry rollers 156 and 158. These rollers 156 and 158 bear on the upper edges of the horizontal members 90 and 92 respectively, of the vertically movable frame 70.

Adjacent to the cross member 88 of the vertically movable frame 70 are bearing supports 160 and 162 carried by the side members 90 and 92, respectively, of the vertically movable frame 70. Mounted on each of these bearing supports 160 and 162 is a pair of spaced rollers 164 and 168 which engage upper and lower edges 170 and 172, respectively, of the carriage track bars 146 and 148.

Thus, the pallet handling carriage 140 is horizontally reciprocally mounted on the vertically movable frame 70 and is freely operable on the rollers 156, 158, 164, and 168, as hereinbefore described.

Coupled to the cross member 152 is a lug 174 through which a pin 176 extends. This pin 176 provides a coupling for a plunger shaft 178 of a hydraulic cylinder 180 which is pivotally mounted on a cross member 182, interconnecting the side bars 90 and 92 of the vertically movable frame 70. This hydraulic cylinder 180 provides actuating force to move the pallet handling carriage 140 horizontally on the vertically movable frame 70.

The vertically movable frame 70 is provided with means for centering pallets laterally thereof when the pallet carriage 140 is retracted to the vertically movable frame. Attention is directed to FIGS. 3, 15, and 16, wherein the means for centering pallets laterally of the vertically movable frame is shown.

Interconnecting the side bars 90 and 92 of the vertically movable frame are spaced parallel rods 184 and 186 which extend through openings in the bars 90 and 92 and are fixed longitudinally by means of nuts screw threaded on the ends of said rods 184 and 186.

Fixed on the rods 184 and 186 are bars 188 and 190 having respective upper edges 192 and 194 on which pallets may be carried as will be hereinafter described in detail.

Slidably mounted on the rods 184 and 186, adjacent the frame bar 90, are slide bearings 196 and 198 which carry a plate 200. Secured to this plate 200 is a lug 202 through which a pin 204 extends. This pin 204 also extends through a clevis 206 of a plunger 208 reciprocally mounted on a hydraulic cylinder 210. This hydraulic cylinder 210 is mounted by means of a pin 212 to a lug 214 fixed to a movable plate 216 located adjacent the side bar 92 of the vertically movable frame 72. The plate 216 is fixed to slide bearings 218 and 220 which are slidably mounted on the rods 184 and 186, respectively.

The inner ends 222 and 224 of the slide bearings 218 and 220 are arranged to abut stops 226 and 228 on the bar 188 when moved inwardly by the cylinder 210 and the inner ends 230 and 232 of the slide bearings 196 and 198 are arranged to abut stops 234 and 236 of the bar 190 when moved inwardly by the plunger 208 of the cylinder 210.

These stops precisely locate the inward movement of the plates 200 and 216 so that pallets may be centered therebetween and laterally with respect to the frame bars 90 and 92 of the vertically movable frame 70.

Referring to FIG. 16 it will be seen that a pallet, as shown by broken lines A, may be engaged at its opposite edges by the plates 200 and 216 when the hydraulic cylinder 210 is energized. The pallet, as shown by broken lines A, is on the same plane as it will be when the pallet-handling carriage is retracted relative to the vertically movable frame as will be hereinafter described.

Reference is made to FIGS. 24 and 25 wherein an extended position of the pallet handling carriage is shown by broken lines and wherein pallets laden with concrete blocks B are disclosed on the pallet handling carriage. These concrete blocks B are shown by solid lines C in a retracted position relative to the vertically movable frame of the machine and the pallets are disclosed by solid lines D in such retracted position. These solid line positions D correspond vertically to the broken line position A in FIG. 16 of the drawings, as hereinbefore described. It will be seen from FIGS. 16 and 24 that the laden pallets may be retracted to the solid line positions as shown in FIG. 24 wherein they coincide with the broken lines position A of such pallets laterally of the vertically movable frame bars 90 and 92.

In order to center these pallets, the plates 200 and 216 are moved inwardly to engage opposite edges of the pallets when the hydraulic cylinder 210 is actuated. Thus, the pallets are centered relative to the vertically movable frame bars 90 and 92. This lateral centering is necessary since the pallets are received from a concrete block producing machine when the pallet handling carriage 140 is extended in the broken line position as shown in FIG. 24 of the drawings. Sometimes these pallets are not precisely centered relative to the pallet handling carriage 140 and therefore it is necessary to center them relative thereto before they are ejected into a rack which holds them after the laden pallets have been delivered from the concrete block producing machine.

Cooperative with the plates 200 and 216 for locating the pallets precisely in a lateral position with respect to the bars 90 and 92, is a further means for laterally locating the vertically movable frame and pallet carriage with respect to the shelves in stationary racks wherein laden pallets are placed by the pallet handling machine of the present invention.

This further means comprises an actuator cylinder 240 carried on the horizontal bar 90 of the vertically movable frame 70. This hydraulic cylinder 40 is secured to the bar 90 by means of a clamp 242 so that the axial alignment of the cylinder 40 is fixed relative to the longitudinal axis of the frame bar 90. The cylinder 240 is provided with a plunger 244, having a clevis 246 supporting a roller 248. This roller 248 is engageable in a vertical channel member 250 of a stationary rack which receives laden pallets from the pallet handling carriage of the present invention. The roller 248, when forced outwardly into engagement with the channel 250 of the rack, causes precise location and alignment of the vertically movable frame about the vertical axis common to the bearings 52 and 58 as hereinbefore described which support the vertical column 54.

As will be hereinafter described, limit switch mechanism is provided to stop the swinging movement of the vertically movable frame about its vertical axis to attain approximate lateral alignment of the frame bars 90 and 92 with a shelf of the pallet rack whereupon actuation of the cylinder 240 forces the roller 248 to engage the channel 250 and thereby finalize the exact pivotal alignment of the vertically movable frame and pallet carriage relative to the shelves of the pallet racks.

Figure 19:
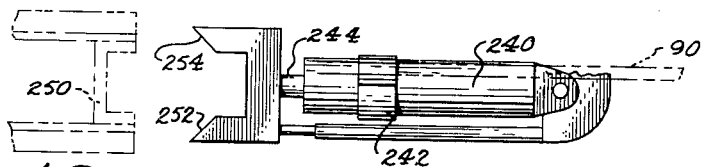
FIG. 19 is a view similar to FIG. 18 but showing a modification of the mechanism illustrated thereby.
Figure 20:
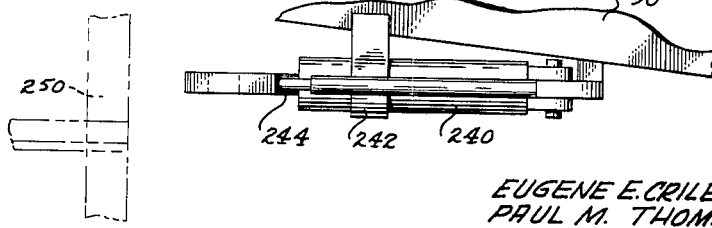
FIG. 20 is a view similar to FIG. 17 but showing the modification illustrated in FIG. 19 and further illustrating by broken lines, elements of a pallet rack.

Attention is directed to FIGS. 19 and 20, wherein the cylinder 240 is provided with a plunger 244 carrying a head having diverging surfaces 252 and 254 which engage opposite edges of the channel member 250 of the pallet rack as hereinbefore described. It will be obvious to those skilled in the art that, either a roller which engages between flanges of a channel member or other structure such as diverging surfaces which engage the outside opposite edges of a structure, will perform the final aligning function. This final aligning function is necessary so that exact placement of the laden pallets in the pallet rack shelves may be accomplished following the lateral centering of such pallets with respect to the pallet handling carriage by means of the plates 200 and 216 hereinbefore described.

Located near the rear ends of the pallet carriage bars 142 is a limit switch operating cross bar 256 which is supported by plungers 258 and 259, reciprocally mounted in tubes 260 and 261. The ends of the rods 258 and 259 are provided with heads 262 and 264 engaged by springs 266 and 268 tending to hold the bar 256 forwardly in the direction of the arrow B shown in FIG. 10 of the drawings. The cross bar 256 is provided with a rearwardly extending tab 270, disposed to engage an arm 272 of a limit switch 4 when a pallet, as indicated by broken lines A in FIG. 10 of the drawings, is delivered by the block producing machine and engage the cross bar 256 thereby forcing it backwardly together with the plunger rods 258 and 259. The pallet is forced into the dash line position A by the concrete block producing machine which slides it onto the bars 142 of the pallet handling carriage 140. The movement of the pallet into the dash line position A and rearwardly thereof, forces the tab 270 into engagement with the arm 272 of limit switch 4 and initiates operation of the pallet handling machine of the present invention. The cycle of operation, including this function, will be hereinafter described in detail.

When a laden pallet is received on the bars 142 of the pallet handling carriage and actuates limit switch 4, as hereinbefore described, a cycle of the pallet handling machine of the present invention is initiated.

As shown in FIG. 9, the hook 358 is provided with trunnions 359, which mount the hook pivotally between the bars 142. A spring 361 permits resilient deflection of the hook downwardly, as indicated by broken lines L, when the hook is carried upward under a laden pallet M, delivered by a concrete block producing machine. It will be understood that the pallet M is moved to the position, as shown in FIG. 9, before the carriage bars 142 move upwardly to clear the concrete block producing machine.

Also shown in FIG. 9 is a modified hook 363 which is withdrawn in the direction of the arrow P by power cylinder 365 so that the hook 363 will be out of interference with the pallet M when the carriage 140 raises to clear the concrete block producing machine.

Reference is made to FIG. 27 of the drawings, wherein limit switch 4 is disclosed in circuit with contact No. 1 of disc 271 of a stepper switch 273 which comprises discs 275, 277, and 279, coupled therewith on a common axis. All of these discs are shown in FIGS. 27 and 28 of the drawings. The discs 271, 275, 277, and 279, inclusive, of the stepper switch 273 are operated by an actuator 284 which is a common solenoid actuated ratchet mechanism energized by various functional elements of the machine during various stages of operation.

Attention is directed to FIG. 27, wherein a line conductor 274 is coupled to wiper arms 276, 278, and 282 of discs 271, 275, 277, and 279, respectively, of the stepper switch 273.

When limit switch 4 is closed, it completes a circuit to the solenoid actuator 284 of the stepper switch which is coupled by a conductor 286 to a conductor 288.

Thus, when limit switch 4 is closed, as hereinbefore described, the actuator 284 is energized to move the arms 276, 278, 280 and 282 to the contacts No. 2 on the discs 271, 275, 277, and 279, respectively. With the arms coupled to contacts 2, a solenoid valve 290 is energized through contact No. 2 on disc 275 and this solenoid valve 290 conducts hydraulic pressure fluid to the hydraulic cylinder 110 causing its plunger 108 to actuate the chain 100 and raise the carriage 140 upwardly until a limit switch 5, as shown in FIG. 13, is actuated.

This switch 5 is supported on the carriage frame 70 and is provided with a pivotally mounted actuating arm 292, which engages a stationary clip 294 held by a bar 296 adjacent to the carriage frame 70. Thus, actuation of the limit switch 5 closes a circuit between contact 2 of disc 271 and the stepper switch actuator 284 to move the stepper switch to position No. 3, wherein the arms 276, 278, 280 and 282 conduct to contacts No. 3 on discs 271, 275, 277, and 279, respectively. When the stepping switch is moved to position 3, a solenoid valve 298 is energized through contact 3 of disc 277. A solenoid valve 300 may also be energized, depending upon the position of contacts in a relay 302, as will be hereinafter described in detail.

Energization of the solenoid valve 298 supplies hydraulic fluid under pressure to the hydraulic cylinder 118, shown in FIG. 6, which acts to rotate the pallet handling carriage about a vertical axis in a direction F toward a broken line position D, shown in FIG. 2 of the drawings. While the stepping switch contact arms are in conductive relation with the contacts 3 thereof, a solenoid valve 304 is energized through disc 279 and this solenoid valve conducts fluid pressure the hydraulic cylinder 180 to retract pallet handling bars 142 of the pallet handling carriage so that the bars 142 will clear pallet racks 306, shown in FIG. 2 of the drawings. It will be understood that the pallet carrying bars 142 are retracted during their pivotal movement around a vertical axis to the broken line position D, shown in FIG. 2 of the drawings. As the pallet carrying bars 142 move inwardly with laden pallets thereon, a limit switch 8, carried on the side bar 90 of the carriage frame, is actuated by a projecting arm 308 carried by the trunnion 153 of the pallet carriage. When limit switch 8 is engaged by the arm 308, it closes a circuit to the stepper switch actuator 284 which is then energized to move the arms of the stepper switch to conductive relation with the contacts 4 of the discs 271, 275, 277, and 279.

Contact 4 of disc 275 is then coupled to limit switch 15 in series with limit switch 1 which is provided with an arm 310 which may alternately contact with a pair of contacts 311 or 312, coupled respectively to solenoid valves 290 and 314. In the respective position of operation, the arm 310 engages the contact 312 to energize the solenoid valve 314 to supply hydraulic fluid to the cylinder 110 in a reverse direction as supplied by the solenoid 290, whereby the carriage is permitted to move downwardly by extension of the hydraulic cylinder plunger 108 and downward movement of the chain 100 which is coupled to the carriage frame 70. The actuation of limit switch 1 by vertical movements of the mechanism of the present pallet handling machine will be hereinafter described in detail. However, in the position shown in FIG. 14 of the drawings and in FIG. 27, the contact 312 is now in position to energize the solenoid 314 and the carriage moves down while it is still swinging about a vertical axis, as hereinbefore described.

At the same time, a solenoid valve 316 is energized through contact 4 of disc 279 and this solenoid 316 conducts fluid under pressure to the cylinder 210 to actuate the plates 200 and 216 inwardly in order to center the pallets relative to the side bars 90 and 92 of the pallet handling carriage. Thus, the laden pallets are centered on the pallet handling bars 142, as hereinbefore described. As the carriage continues its downward movement, limit switch 15, mounted on the carriage frame 70, contacts an arm 318, supported by a magnetic shelf height locator 320 which is vertically movable on a slide bar 322.

The magnetic shelf height locator is arranged to hold itself magnetically on the bar 322, as will be hereinafter described in detail. The limit switch 15 is provided with an arm 15a, which contacts the extending arm 318 of the magnetic shelf height locator 320. It will be noted that limit switch 15 is provided with a pair of contacts, one of which is coupled to contact 4 of disc 275 and the other of which is coupled to contact 4 of disc 271. These are alternately open and closed so that the contact of limit switch 15, coupled with contact 4 of disc 275, is now open and the contact arm, coupled with contact 4 of disc 271, is now closed and is in series with limit switch 7 also coupled to contact 4 of disc 271.

Limit switch 7 is closed by swinging movement of the carriage about a vertical axis. Attention is directed to FIG. 1, wherein limit switch 7 is disclosed. This limit switch 7 is provided with a contact arm 319 which is engageable by a clip 321 on an arm 324 carried by the column 54. Thus, as the arm 324 swings through approximately a 90 degree travel, as shown in FIG. 2 of the drawings, limit switch 7 is closed and when it is closed in series with the closed contact of limit switch 15, the solenoid actuator 284 is energized and the stepping switch is automatically advanced to position 5.

It will be understood that limit switch 7, on one side of the machine, is equivalent to a similar switch on the opposite side which limits the swinging movement of the carriage to substantially 90 degrees in the opposite direction. As for example, in FIG. 2 of the drawings, limit switch 7 limits the swinging movement of the carriage in the direction of the arrow F while a similar limit swtch 7a limits swinging movement in the direction of the arrow G, in FIG. 2 of the drawings, all as will be hereinafter described in detail. It will be seen that limit switch 7 energizes the stepping switch to position 5 on discs 271, 275, 277, and 279, at a time when the carriage is aligned with the respective shelf of one of the racks 306.

Accordingly, position 5 on disc 277 causes energization of a solenoid valve 326 which conducts fluid under pressure to the hydraulic cylinder 240 to extend its plunger 244 and to carry the roller 248 into engagement with a channel member 250 of one of the pallet racks 306 to thereby attain precise alignment of the carriage bars 142 with pallet supporting shelf members 328 and 330 which support opposite edges of the laden pallet when delivered by the pallet carriage of the present machine.

Contact 5, on plate 279 of the stepper switch, is coupled to a solenoid valve 332 which conducts fluid under pressure to the hydraulic cylinder 180 to extend the plunger 178 whereby the bars 142 of the pallet carriage are projected outwardly between the shelf members 328 and 330 of a pallet rack 306 in order to deposit the laden pallets on these shelves. As the carriage is extended, the arm 303 contacts a pivoted arm 309 of limit switch 141 which energizes the actuation 284 of the stepping switch to a position wherein the arms 276, 278, 280, and 282, contact respective contacts 6 of discs 271, 275, 277, and 279, respectively.

When the arm 278 of the stepping switch 273 is coupled to contact 6 of disc 275, the solenoid valve 314 is energized to conduct fluid under pressure to the hydraulic cylinder 110 in a direction to extend the plunger 108 thereof and lower the frame 70 together with the carriage bars 142, thereby permitting the edges of the laden pallets to come to rest upon the shelf members 328 and 330 of the rack 306.

As the carriage moves downward, the lower surface of the bars 142 approach the next lower shelf in the pallet rack 306 and move downward toward empty pallets resting on the next lower shelf rails 328 and 330. The carriage continues to move downwardly until a switch bar 334 engages the upper surface of the next lower unladen pallet. This switch bar 334 is pivotally mounted on one of the bars 142 by a bolt 336, as shown best in FIG. 11 of the drawings. The rearward end of the bar 334 is provided with an upwardly extending portion 338, which contacts a pivoted arm 340 of a limit switch 29. When this arm 340 is moved upwardly, it opens the contacts of limit switch 29 and thus opens a circuit and de-energizes the magnetic shelf height locator 320 and a latch bar solenoid 352.

It will be understood that previous to de-energization, the magnetic shelf height locator 320 held itself fixed on the vertical bar 322 and while the bars 142 of the carriage move down to actuate limit switch 29, a latch bar 346 carried by the frame 70 moves down a distance correspondingly below the magnetic shelf height locator 320, as shown in FIG. 14. Thus, when the magnetic shelf height locator 320 is de-energized and slides down the bar 322, an arm 342 is disposed to engage an arm 344 of the latch bar 346 which is pivoted on the carriage frame 70 by a pin 348. Thus, the magnetic shelf height locator 320 drops to a position limited by the arm 344 in correspondence with the vertical disposition of an unladen pallet previously located by the bar 334 which actuates limit switch 29 to de-energize the electromagnet of the magnetic shelf height locator 320.

The latch bar 346 is normally held in the solid line position, as shown in FIG. 14, by a spring 350 and this latch bar 346 may be pivotally actuated by a solenoid 352 in order to pivot the arm portion 344 out of interference with the arm 342 of the magnetic shelf height locator, as will be hereinafter described in detail.

It will be noted here that the solenoid 352 and the magnetic shelf height locator 320 are in circuit with each other, whereby they are concurrently energized and de-energized. Thus, when the magnetic shelf height locator is energized and fixed on the bar 322, the solenoid 352 is also energized to hold the arm 344 out of interference with the arm 342, whereby the arm 344, carried by the frame, may pass the arm 342 without disturbing the position of the shelf height locator.

When the switch 29 is actuated, as hereinbefore described, it also energizes the stepping switch actuator 284 and energizes the stepping switch to a position in which the arms close with the contacts 7 of discs 271, 275, 277, and 279. It will be seen from FIG. 27 of the drawings, that the limit switch 29, when actuated by the arm portion 338, shown in FIG. 11, opens a switch 354 and closes a switch 356 whereby the magnetic shelf height locator 320 and the solenoid 352 are deenergized and the stepping switch actuator 284 is energized.

With the arms of stepping switch engaging contacts 7 of the discs 271, 275, 277, and 279, it will be seen that contact 7 on disc 279 is coupled with a solenoid valve 304 which supplies fluid under pressure to a hydraulic cylinder 180 in a direction to retract the plunger 178 and to cause retraction of the carriage bars 142 from a position between the vertical members of the pallet rack 306. During this retraction of the pallet carriage bars 142, a pallet hook 358, as shown in FIG. 9 of the drawings, rakes empty pallets from the shelf of the rack immediately below the laden pallets deposited on the shelf above. The hook 358 extends downwardly so that it engages the edge of the pallets and when the bars 142 of the pallet carriage are retracted, this hook 358 rakes the pallets backwardly onto the upper edges 192 and 194 of the bars 188 and 190, hereinbefore described in connection with FIG. 16 of the drawings. As the carriage is retracted, the bar 308, shown in FIG. 4 of the drawings, contacts limit switch 8, shown in FIG. 3 of the drawings, and this limit switch energizes the stepper switch 273 to a position wherein the arms thereof are coupled to the contacts 8 of the discs 271, 275, 277, and 279, inclusive.

Contact 8 on disc 275 then provided closed circuit to the solenoid valve 290 due to the fact that an arm 359 of the limit switch 2, shown in FIGS. 13 and 27 of the drawings, is in a position wherein it closes a circuit to the solenoid valve 290 which conducts fluid under pressure to the hydraulic cylinder 110 in a direction to retract the plunger 108 thereof and to raise the carriage upwardly toward a level at which the concrete block producing machine delivers laden pallets. Concurrently, energy through contact of disc 277 energizes the solenoid valve 298 which conducts hydraulic fluid under pressure to the hydraulic cylinder 116 in a direction to retract its plunger 124 and to rotate the column 54 and carriage 70 in a clockwise direction, as shown in FIG. 2, to thereby swing the carriage of the present machine around toward a delivery axis H of the concrete block producing machine.

The operation of the reversing switch contacts 302 and 303, is simultaneously accomplished by a relay 364 controlled by a disc 366 of a stepper switch 368 having additional discs 370 and 372, as will be hereinafter described.

It will be seen that the stepper switch 368 is energized by means of a conductor 374 coupled to conductor 274.

The relay 364 is a conventional spring loaded solenoid which spring loads the contacts 302 and 303 in one position with respect to the solenoid valves 298 and 300 while energization of the relay 364 causes magnetic shifting of the contacts 302 and 303 to a reverse position. These solenoid valves control the operation of hydraulic cylinders 116 and 118, respectively, which actuate the carriage to swing about a vertical axis. Reversal of the contacts 302 and 303 by the stepper switch 368 is accomplished each time four bays of a rack are filled whereby the solenoids 298 and 300 are properly energized to operate the carriage to and from the concrete block producing machine from either side of the delivery axis H, as shown in FIG. 2 of the drawings.

During the movement of the carriage around to the delivery axis H of the concrete block producing machine, the solenoid 316 is energized to supply fluid under pressure to the hydraulic cylinder 210 in order to force the plates 200 and 216 together so that the empty pallets carried on the edges 192 and 194 of the bars 188 and 190 will be centered relative to the delivery axis H of the concrete block producing machine so that the unladen pallets may be properly delivered to the machine, as will be hereinafter described.

As the carriage frame 70 moves upwardly during its swinging action into alignment with the axis H, hereinbefore described, the limit switch 12 approaches a stationary clip 295 on the bar 296, as shown in FIG. 13 of the drawings. A contact arm 378 of limit switch 12 contacts said clip 295 and this stops the upward travel of the carriage and positions it at a proper vertical level to align with the concrete block producing machine to discharge empty pallets thereinto and subsequently to pick up loaded pallets.

Limit switch 13, as shown in FIG. 1 of the drawings, is carried by the upper member 104 of the frame and is operable by an arm 324, as hereinbefore described, so that as the carriage swings around in the direction of the arrow G, shown in FIG. 2 of the drawings, limit switch 13 is actuated to de-energize the solenoid valve 298 and to stop the actuation of the hydraulic cylinder plunger 124, shown in FIG. 6 of the drawings, in order to bring the carriage into alignment with the delivery axis H of the concrete block producing machine, as shown in FIG. 3 of the drawings. When limit switches 12 and 13 are closed in series with each other, as shown in FIG. 27, they energize the stepper switch actuator 284 so that the arms of this stepper switch move to contacts 9 of discs 271, 275, 277, and 279, inclusive. In this position, the stepper switch energizes the solenoid valve 322 by means of the contact 9 on disc 279, whereupon fluid under pressure is supplied to the hydraulic cylinder 180 to extend the plunger 178 thereof, and to extend the bars 142 to a position relative to the concrete block producing machine, wherein the unladen pallets are moved, by a downwardly depending member 191 from the bars 188 and 190 into the concrete block producing machine and wherein these bars 142 are disposed to receive laden pallets from the machine. The downwardly depending member 191 is carried at the lowermost portions of the bars 142 and 144, all as shown in FIGS. 10, 24 and 25. At the outward limit of carriage travel, during the extension of the bars 142, limit switch 141 is actuated by the bar 308 on the pallet carriage, whereby the solenoid valve 332 is operated to stop the flow of hydraulic fluid to the cylinder 180. It will be seen that the solenoid valve 332 is concurrently deenergized with the energization of the actuator 284 of the stepper switch when it is then actuated to a position in which the arms 276, 278, 280 and 282 are moved to the contacts 9 of the discs 271, 275, 277, and 279, inclusive. At this time, the stepper switch is automatically energized through positions corresponding to contacts 10, 11, 12, and 13, of discs 1 to 4, inclusive, which returns the stepper switch arms to contacts 1 on the respective discs.

The pallet handling machine of the present invention, then proceeds through subsequent cycles corresponding to the hereinbefore described cycle, until the shelves of the racks 306, below the machine level are filled with laden pallets, whereupon the carriage finally moves to a position below the normal level of the lowermost pallet shelf, whereupon an arm 382 of limit switch 17 engages a clip 384 on the bar 296 to deenergize solenoid valve 314 and stop it from supplying fluid under pressure to the plunger 108 and the lowering of the carriage frame 70. It will be seen that the limit switch 17 is provided with a contact arm 382 which closes to energize the stepper switch actuator 284 which thereby moves the arm 278 from contact 6 to contact 7 on disc 275 of the stepper switch which results in deenergization of the solenoid valve 314.

When limit switch 17 is actuated, as hereinbefore described, its contact arm 388, shown in FIG. 27, closes a circuit to relays 390 and 392.

When limit switch 17 is operated, it also energizes an actuator 426 of the stepper switch 368, as will be hereinafter described.

When relay 390 is energized, it opens contacts 394, deenergizing the electromagnet 352 and the magnetic shelf height locator 320 so that it may be slidably moved upwardly on the bar 322 by engagement of the lever arm 344 with the arm 342 projecting from the shelf height locator 320, all as shown best in FIG. 14 of the drawings.

With the deenergization of contact 7 on disc 271 of the stepper switch 273, the pallet handling carriage is retracted, as hereinbefore described, and the carriage then moves upwardly to a level coinciding with the concrete block producing machine so that it may return to the machine in alignment with the axis H, thereof, as hereinbefore described. As the carriage moves upwardly and while the shelf height locator 320 is deenergized, it is carried up the bar 322 by the lever 344 along with the carriage 70. During the movement of the shelf height locator 320, upwardly on the bar 322, a projecting arm 398, carried by the shelf height locator 320, contacts a roller 400 on a pivoted arm 402 of limit switch 2, thereby pivoting this arm and contact arm 359 into the broken line position, as shown in FIGS. 14 and 27 of the drawings. This action moves the contact arm 358 of limit switch 2, as shown in FIG. 27 of the drawings, to the broken line position while the carriage 70 continues upward to a delivery level of the machine so that it may subsequently swing into alignment with the delivery axis H of the machine, as hereinbefore described, in connection with FIG. 2 of the drawings.

When the carriage of the present invention returns to the machine, as hereinbefore described, and receives laden pallets, the carriage is automatically energized to move upwardly to clear the machine, as hereinbefore described.

While the lowermost rack shelf has just been previously filled, it is now necessary that the machine carriage move upwardly to start filling the uppermost shelves of the next succeeding bay of pallet racks. Thus, as the carriage moves upwardly to clear the machine, as hereinbefore described, the arm 398, as shown in FIG. 14 of the drawings, moves beyond a position of limit switch 2 and contacts a roller 404 on a pivoted arm 406 of limit switch 1, thereby moving it to the broken line position, shown in FIG. 14 of the drawings. This moves the contact arm 310 of limit switch 1 into the broken line position shown in FIGS. 14 and 27.

From the foregoing it will be appreciated that LS1 and LS2 control vertical movement of the carriage with respect to a delivery level of the concrete block producing machine and with respect to pallet rack shelves above said delivery level and below said delivery level. As for example, as shown in FIGS. 14 and 27, when LS1 and LS2 are in the solid line positions, that in position 4 of each operating cycle of the machine, the solenoid valve 314 will be energized when the carriage is moving away from the machine so that the carriage will go down to a rack shelf below the delivery level of the machine.

In position 8 on disc 275, when the carriage is proceeding from the rack to the machine, it will be seen that LS2 at its arm 358 is closed with contact 363 so that the solenoid 290 will be energized and that the carriage will then be energized upwardly in its movement back to the delivery level of the concrete block producing machine.

When the arms 310 and 358 of LS1 and LS2, respectively, are in the broken line position, shown in FIGS. 14 and 27 of the drawings, a reverse situation will occur with respect to the vertical movement of the carriage and the delivery level of the concrete block producing machine. As for example, when contact 4 of an operating cycle is made on disc 275, the arm 310 will couple with contact 311 and thus, energize the solenoid 290 to energize the carriage upwardly as it moves away from the concrete block machine and subsequently when contact 8 on disc 275 is reached, contact arm 359 is engaged with contact 361, thus, energizing the solenoid valve 314 to energize the carriage downward in its return to the level of the concrete block producing machine. Thus, the switches LS1 and LS2 operated by arm 342, shown in FIG. 14, automatically prearrange the electrical circuit of the invention so that the carriage is properly energized in an upward direction or in a downward direction depending upon the preceding cycles of operation of the machine. For example, when the carriage has filled pallet rack shelves and has progressively moved down from one cycle to the next, the switches LS1 and LS2 are tripped by the arm 398, shown in FIG. 14, and the carriage is thus automatically returned to the block producing machine at its delivery level, in accordance with the disposition of the carriage as it fills its last successive rack shelf before returning to the concrete block producing machine.

As the pallet rack shelves are filled from the top toward the bottom, LS1 is first tripped from a broken line position to a solid line position, shown in FIG. 14, whereupon arm 310 engages contact 312 which in position 4 of an operating cycle with respect to disc 275, causes the carriage to move downwardly from the machine toward the rack and subsequently, as the arm 398 trips the arm 400 of LS2 from the broken line position to a solid line position, arm 358 engages contact 363 whereupon the carriage of the machine will move up from a rack shelf in its travel back to the delivery level of the machine.

At this time, the stepper switch arm 278 is coupled to contact 2 of disc 275 and the solenoid valve 290, as hereinbefore described, is energized which conducts fluid under pressure to the cylinder 110 so that it retracts its plunger and continues to move the carriage 70 upward.

During the time that the carriage continues to move upward, relay 5, which is a locking type relay provided with time delay circuitry, permits a time delay for the advancement of another rack of shelves. Attention being directed to FIG. 2 of the drawings, wherein several bays of the racks 306 are carried by a truck 408, having wheels 410 running on tracks 412. The truck 408 is provided with a suitable motor 414 to activate the wheels 410 for traction on the tracks 412 in order to advance the bays of racks 306, relative to the broken line position D of the pallet handling machine carriage, all as will be hereinafter described in detail. It will be seen that the rack carried by the truck 408 is provided with four bays having a plurality of superimposed shelves for receiving laden pallets thereon. The carriage 140 moves to its topmost position, wherein an arm 416 of limit switch 6 contacts a stop 418 on bar 296 which causes limit switch 6 to open and deenergize relay 4 which permits the contact arm 394 to close and energize the shelf height locator 320 so that it holds itself on the bar 322 until an unladen pallet is contacted, as hereinbefore described, whereupon the shelf height locator magnet is deenergized, permitting it to fall and establish an elevation of the unladen pallet by contact of the arm 342 upon the projecting arm 344 of the latch lever 346.

From the foregoing, it will be apparent that each time the lowermost shelf in one bay of the rack 306 is loaded and when the limit switch 17 is actuated, that the truck 408 must move another bay of rack shelves into alignment with the broken line position D of the pallet handling machine carriage. This same mode of operation is common to the opposite side of the pallet handling machine with relation to a truck 409, not shown, but which is similar to the truck 408.

When the contacts of limit switch 16 are closed, the relay 392 is energized, whereupon it locks its contact arms 443, 445, and 447, thereby closing the circuit to energize the motors 414 and 415 through contacts 445 and 447, respectively.

It will be understood that one of the trucks moves toward the concrete block producing machine for successive loading of the bays in the rack carried thereby, while the other truck 409, not shown, will be moving away from the machine after having been fully loaded in all of its bays. Thus, according to FIGS. 27 and 28 of the drawings, the truck 408 is movable by the motor 414 in response to a closing of the relay contact arm 445 and during the delay provided by operation of the thermally responsive element 418 of the relay 392, the motor 414 moves the truck 408 far enough so that the limit switch 22 is closed to permit operation of the motor 414 to continue until another clip 407, as shown in FIG. 2 of the drawings, opens the limit switch 22, whereupon another bay of rack shelves is aligned with the broken line position D of the carriage, as shown in FIG. 2 of the drawings.

It will be understood that a clip 407 is arranged to align with each bay of rack shelves so that each time a motor is energized by closing of the arm 445 of the relay 392, that sufficient time is provided for the motor 414 to move the truck far enough to clear the limit switch 22 from the respective clip 407 so that the motor 414 may continue to operate until another bay of rack shelves is reached whereupon another clip 407 will actuate the limit switch 22 and open the circuit to the motor 414.

As shown in FIG. 2, the clips 407 are mounted on a bar 403 which is slidably mounted on the truck 408 and thus bar 403 is spring loaded in a direction away from the motor 414 by a spring 401. A clip 405 on the bar 403 is engaged by the end of the pallet rack when loaded on the truck 408 whereby the bar 403 is adjusted longitudinally against tension of the spring 401 so that the clips 407 carried by the bar 403 are moved to coincide with the positions of the respective bays of the rack.

It will be understood that after all of the bays of the rack on the truck 408 have been filled, that the truck is in the nearest position forward toward the concrete block producing machine and that it must then be reversed and moved in the opposite direction while the other truck 409, not shown, is advanced bay by bay toward the machine delivering the concrete blocks for successive filling of the bays of rack shelves. During reverse movement of the truck 408, the limit switch 23 acts in a similar manner to the limit switch 22 but permits the motor 414 to operate in the reverse direction so that the rack is moved away from the concrete block producing machine. A clip 411 on the truck 408 contacts an arm 413 of limit switch 23 to stop the truck when moving in the reverse direction.

It will be seen that the limit switch 22 is coupled to contacts 5, 6, 7, and 8 of discs 372, while the limit switch 23 is coupled to contacts 1, 2, 3, and 4 of said discs 372. Thus, there are four contacts operating to energize the motor 414 in reverse while there are four contacts operable to move the truck by energizing the motor 414 in the forward direction.

The truck 409, not shown, is provided with a motor 415, shown in FIG. 27 of the drawings, and this motor 415 is operable through a contact arm 447 and limit switch 20 to operate the motor 415 to move the truck 409 forward while the limit switch 21 is operable to control the reverse operation of the motor 415 to move the truck 409 in the reverse direction. Likewise, the disc 370 of the stepper switch 368 is provided with four contacts for reverse operation of the motor 415 and four contacts for forward operation of the motor 415, all of which is similar to operation of the motor 414, hereinbefore described. It will be seen that the stepping switch 368 is coupled through four of its contacts on disc 366 to the relay 364 which is disposed to reverse the disposition of the contact arms 302 and 303 in order to provide reverse operation of the solenoid valves 298 and 300 so that the cylinders 116 and 118, as shown in FIG. 6 of the drawings, will cause the carriage of the pallet handling machine to move in one direction when leaving the axis H of the concrete block producing machine, toward the truck 408, while the absence of the contacts on the remainder of the disc 366 permits the relay 364 to hold the contact arms 302 and 303 in the opposite direction so that the solenoid valves 298 and 300 will cause the carriage of the machine to be energized in the opposite direction by one of the cylinders 116 or 118 to move in the direction of the arrow G when leaving the axis H of the concrete block producing machine.

Each time the limit switch 17 is actuated, the stepper switch 365, comprising discs 366, 370, and 372, is advanced one position whereby contacts are successively made in a similar manner to that hereinbefore described in connection with the stepper switch 273, which comprised discs 271, 275, 277, and 279, inclusive, and the arms 276, 278, 280, and 282, inclusively.

When the arm 420 traverses the disc 366 of the stepping switch 368 to a position of contact 5 thereon a conventional reset device 425 is energized which automatically moves the arm 420 to a position in contact with contact No. 1 on disc 366.

As shown in FIG. 21, the uppermost shelf of a rack bay, when approached by the carriage of the pallet handling machine, is laden with empty pallets 424. These pallets 424 are shoved to the rear and off the respective upper shelf onto a receiving rack 426 which is stationarily located in line with the broken line position of the pallet handling carriage as illustrated by the reference character D in FIG. 2 of the drawings. When the unladen pallets are shoved off onto the rack 426, they are held at a level which is normally above unladen pallets disposed on the third shelf from the top, as shown in FIG. 22 of the drawings, and when the unladen pallets drop onto the rack 426, they actuate limit switch 24 which energizes a solenoid valve 428 which conducts hydraulic fluid under pressure to a hydraulic cylinder 430 causing its plunger 432 to extend and to force the pallets from the rack 426 and onto the unladen pallets disposed on the third shelf down from the top of the pallet rack shown in FIG. 23 of the drawings. When the pallet handling machine of the present invention places laden pallets on the second shelf from the top of the pallet rack, shown in FIG. 23 of the drawings, the carriage then moves down to a position in which the hook 358 engages all of the pallets on the third shelf from the top and retracts them into a position upon the bars 188 and 190 for return to the machine in a similar manner to that hereinbefore described. It will be understood that when the laden pallets are delivered to the uppermost shelf in the rack, as shown in FIG. 22 of the drawings, that the precise location of the rack is not required from the standpoint of elevation. The shelf height locator 320 is not brought into play for the location of the uppermost shelf. This operation involves the outward movement of the machine carriage at a lever K considerably above the upper shelf whereupon the carriage is lowered to a position below the level of the shelf, thereby depositing the laden pallets on the upper shelf of the rack. This is readily feasible since there are no pallets to be disturbed above the upper shelf on the rack. The lateral location of the pallet handling machine carriage, relative to the placement of laden pallets on the uppermost shelf, is accomplished, as hereinbefore described, by means of the hydraulic cylinder 240 and its respective lateral locator which may comprise either the roller 248, shown in FIG. 18 of the drawings, or the converging fork structure 254, shown in FIG. 19 of the drawings.

It will be obvious to those skilled in the art that various modifications of the present invention may be resorted to in a manner limited only by a just interpretation of the following claims.

We claim:

1. In a pallet handling means the combination of: a pallet rack having a plurality of spaced superimposed pallet supporting shelves; an auxiliary rack disposed at a level corresponding with a shelf below the uppermost shelf of said pallet rack; and an actuator for forcing unladen pallets from said auxiliary rack onto said shelf below the uppermost shelf; a carriage carrying laden pallets disposed to force unladen pallets off said uppermost shelf onto said auxiliary rack; and hook means on said carriage disposed to rake said pallets from said shelf below the uppermost shelf after laden pallets have been deposited on a shelf thereabove.

2. In a pallet handling means the combination of: a pallet rack having a plurality of spaced superimposed pallet supporting shelves; an auxiliary rack disposed at a level corresponding with a shelf below the uppermost shelf of said pallet rack; and an actuator for forcing unladen pallets from said auxiliary rack onto said shelf below the uppermost shelf; a carriage carrying laden pallets disposed to force unladen pallets off said uppermost shelf onto said auxiliary rack; and hook means on said carriage disposed to rake said pallets from said shelf below the uppermost shelf after laden pallets have been deposited on a shelf thereabove; switch means operable by pallets on said auxiliary rack and disposed to energize said actuator.

3. In a pallet handling means the combination of: a first means; a carriage movable back and forth on said first means in a horizontal direction; second means for moving said first means and said carriage up and down; third means on said carriage for supporting laden pallets; hook means on said carriage directed to engage edges of empty pallets supported on horizontal shelves in racks; pallet receiving means on said first means and disposed below said third means; and fourth means for retracting said carriage and said hook means relative to said first means causing said hook means to rake empty pallets off from said horizontal shelves and onto said pallet receiving means.

4. In a pallet handling means the combination of: a first means; a carriage movable back and forth on said first means in a horizontal direction; second means for moving said first means and said carriage up and down; third means on said carriage for supporting laden pallets; hook means on said carriage directed to engage edges of empty pallets supported on horizontal shelves in racks; pallet receiving means on said first means and disposed below said third means; and fourth means for retracting said carriage and said hook means relative to said first means causing said hook means to rake empty pallets off from said horizontal shelves and onto said pallet receiving means; and fifth means on said first means movably disposed to engage opposite edges of said unladen pallets accurately to locate said unladen pallets with respect to said first means.

References Cited by the Examiner

UNITED STATES PATENTS

| | | | |
|---|---|---|---|
| 923,139 | 6/1909 | Clarke | 214—32 |
| 2,412,009 | 12/1946 | Rickland. | |
| 2,675,134 | 4/1954 | Becker | 214—16.42 |
| 2,869,739 | 1/1959 | Davis | 214—16.4 |

GERALD M. FORLENZA, *Primary Examiner.*

HUGO O. SCHULZ, *Examiner.*